Aug. 15, 1939. F. A. WOOL 2,169,509
FRUIT DICING MACHINE
Filed Aug. 7, 1937 2 Sheets-Sheet 1
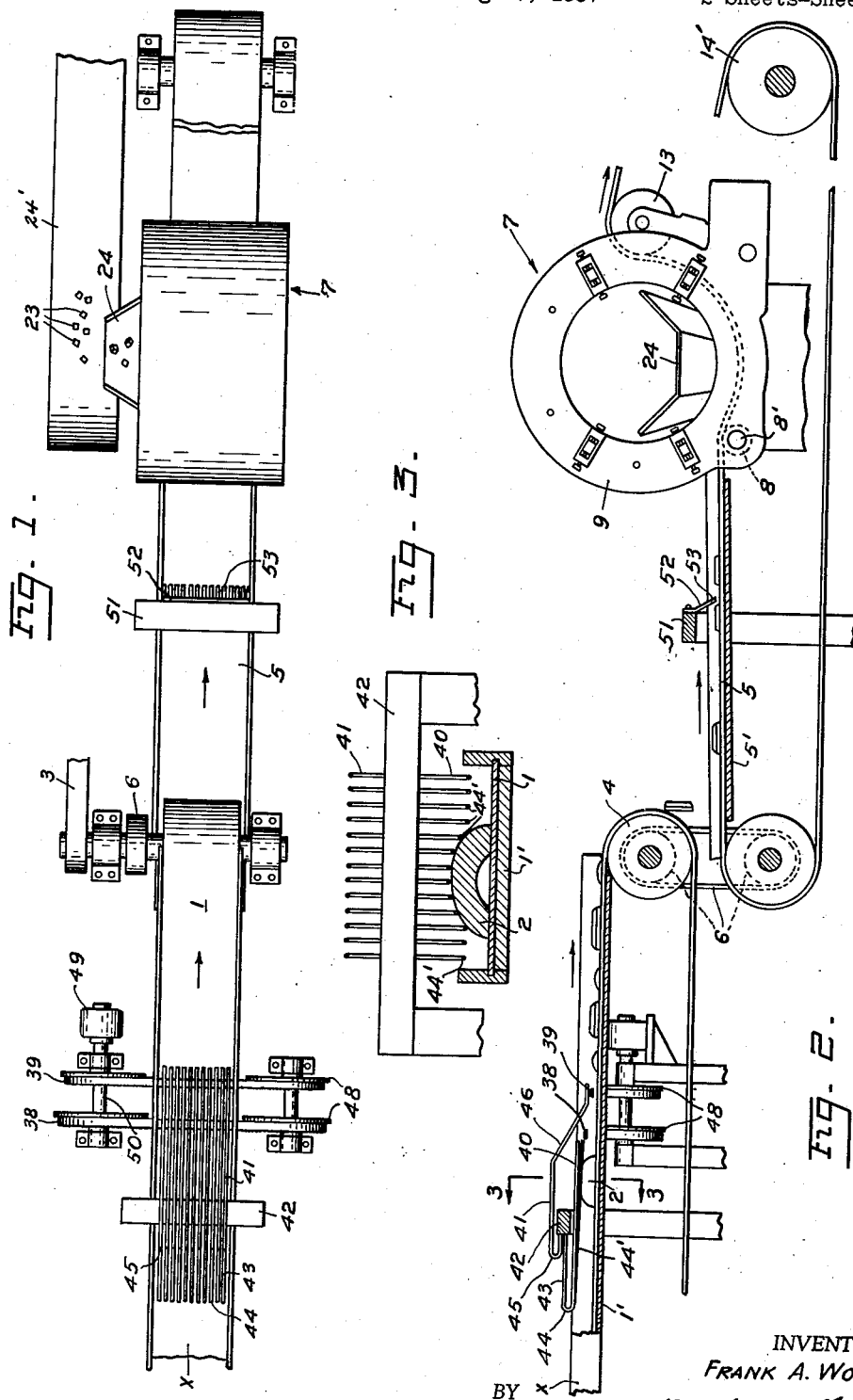
INVENTOR.
FRANK A. WOOL
BY
Boyken & Mohler
ATTORNEY.

Aug. 15, 1939    F. A. WOOL    2,169,509
FRUIT DICING MACHINE
Filed Aug. 7, 1937    2 Sheets-Sheet 2
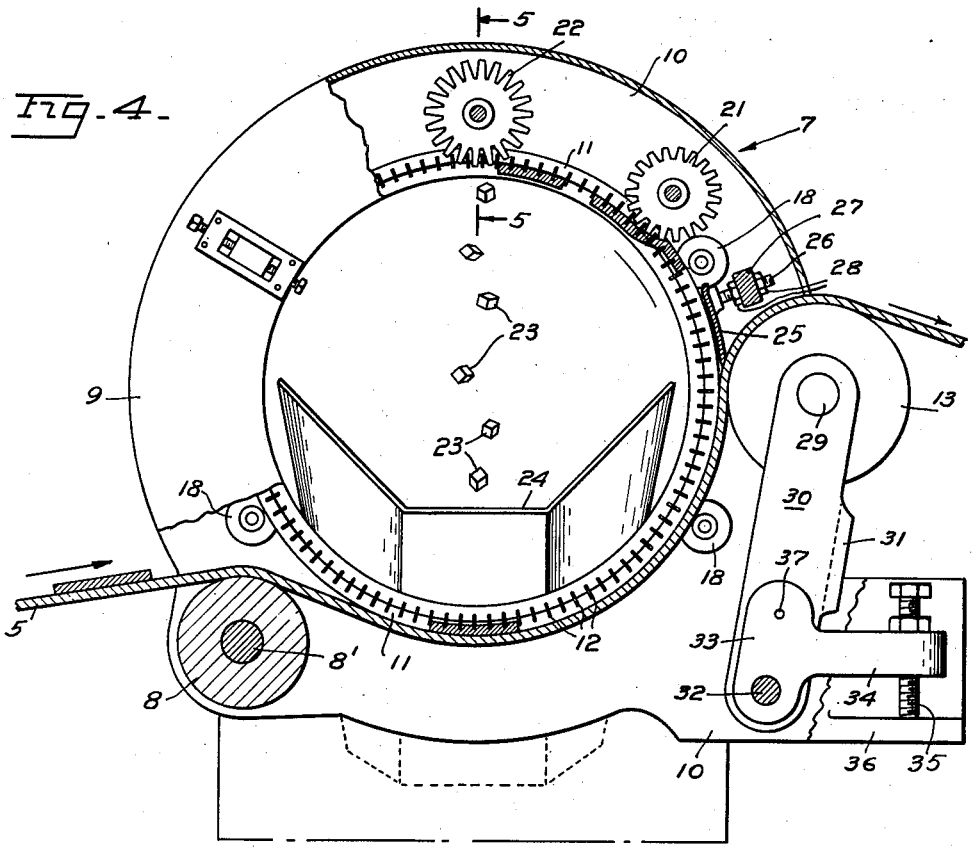
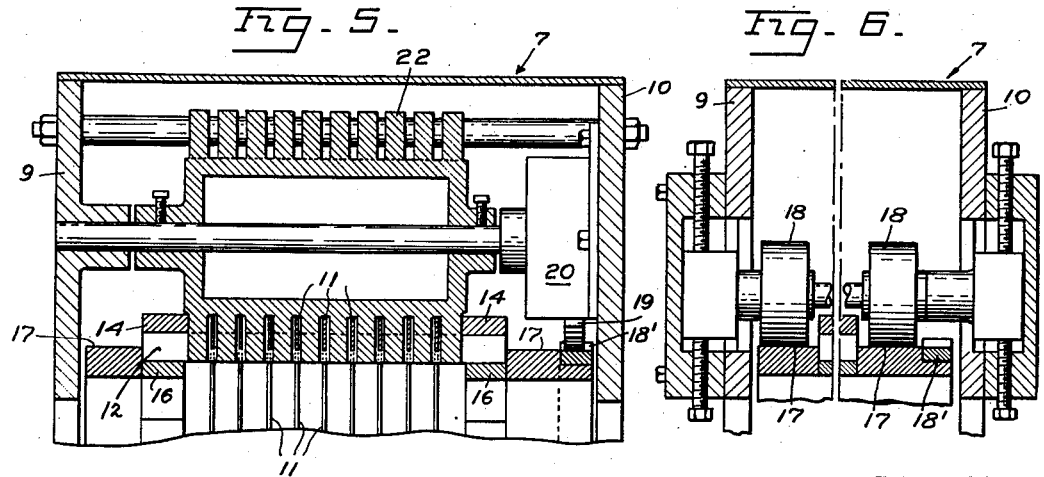
INVENTOR.
FRANK A. WOOL
BY Boyken & Mohler
ATTORNEY.

Patented Aug. 15, 1939

2,169,509

UNITED STATES PATENT OFFICE 2,169,509

FRUIT DICING MACHINE

Frank A. Wool, San Jose, Calif.

Application August 7, 1937, Serial No. 157,928

11 Claims. (Cl. 146—78)

This invention relates to improvements in a machine of generally the same character shown in my co-pending application, Ser. No. 107,442, filed October 24, 1936, for cutting fruit into cubes, which operation is generally known as "dicing" the fruit.

The objects of my invention are to provide improvements in a machine of the above character, for accomplishing insuring a more efficient control of the fruit during and between the steps of cutting fruit halves into dices, and to also provide improved means for automatically stopping operation of the machine in the event of pits or hard foreign material encountering the dicing knives. Other objects and advantages will appear in the specification and drawings annexed hereto.

In the drawings, Fig. 1 is a plan view of my improved apparatus, broken in length to fit the sheet.

Fig. 2 is a longitudinal elevational view of the device of Fig. 1 with certain parts in section for clarity.

Fig. 3 is an enlarged sectional view taken along the line 3—3 of Fig. 2.

Fig. 4 is an enlarged side view of the dicing portion of the machine with certain portions broken away and in section to more clearly show the construction.

Fig. 5 is an enlarged fragmentary sectional view taken along the lines 5—5 of Fig. 4 certain parts being indicated in elevation.

Fig. 6 is an enlarged fragmentary sectional view showing, in elevation, one set of supporting rollers that are a part of the dicing machine.

Referring to Figs. 1, 2, my machine comprises an endless belt conveyor 1 onto end X of which is fed fruit halves 2, such as peaches, applies, pears, etc., which have been cored or pitted and which are arranged on the belt with their cup sides down, which conveyor is moved in the direction indicated by the arrow by any suitable drive means such as a motor (not shown) connected to drive belt 3 that drives pulley 4 mounting one end of the conveyor belt 1.

A second endless conveyor belt 5 extends from below the end of conveyor 1 at pulley 4 in longitudinal extension of conveyor 1. Conveyor 2 may be connected by a belt and pulley connection 6 with drive belt 3 for movement of the upper run of conveyor 5 in the same direction as the movement of the upper run of conveyor 1, hence fruit carried on conveyor belt 1 over pulley 4 will drop onto conveyor belt 5 and will be carried onward on belt 5 in the same general direction as before being dropped thereon.

The upper rim of belt 5 extends below the annular and cross knives of a dicing device generally designated 7, the knives of which device are of a shape, size, and arrangement substantially identical with the knives shown and described in my heretofore mentioned co-pending application Serial No. 107,442.

The upper run of belt 5 extends over a roller 8 on a shaft 8' which shaft is rotatably supported at its ends between the stationary side frame members 9, 10 of the dicing device, the roller 8 supporting the belt 5 elevated above the level of the lowermost portion of the annular knives 11 and the lowermost of the cross knives 12 of the dicing machine, and from which roller the belt 5 extends one-fourth the distance around the periphery of the annular knives and in substantial engagement therewith to the opposite side of the dicing device, where said belt extends over a roller 13 and then away from the dicing device and downwardly to over end pulley 14' of the conveyor.

The cross knives 12 are mounted at their ends in radially extending slots extending from the inner sides of annular rigs 14 (Fig. 5) and are held in place by separate arcuate sections 15 of inner annular ring 16 that engage the radially inwardly facing edges of the cross knives. The outer peripheral surfaces of rings 14 are approximately even with the plane of the outer edges of the annular knives, hence the belt 5 is engaged by such peripheral surfaces as well as by the peripheral edges of the knives, the main force of the belt being on the ring surfaces however. The belt itself is surfaced with rubber and is of endless construction without projecting connecting laces or clips or the like that would injure the knives. Rings 14 are rabbeted along their opposite outer corners to form peripheral shoulder surfaces 17 radially inwardly disposed relative to the aforesaid peripheral surfaces that engage the belt 5, which shoulder surfaces engage trunnion rollers 18 adjustably mounted on each of the frame sides 9, 10 of the dicing device at four equally spaced points around the frame sides for supporting the annular and cross knives for revolving about a horizontal axis. One of said rings 14 als carries outwardly of shoulder surface 17 thereof a ring gear 18' the teeth of which mesh with a gear 19 that is connected with other suitable gears in a gear box 20 for revolving fingered rollers 21, 22 of the same character shown in my co-pending application, the fingers of which rollers mesh in the spaces between the cross knives and annular knives for progressively forcing the fruit past the knives for dropping the cut cubes 23 radially inwardly free of the knives toward the horizontal axis of the cutting device onto a chute 24, for sliding onto conveyor 24'.

The use of the gear driven fingered rollers 21, 22 is highly important since there must be exact synchronism between the surface movement of these rollers and the outer surface movement of the annular and cross knives so as to preclude any chance of the fingers of said rollers injuring the cutting edges of the knives.

From the foregoing, it will be seen that the annular and cross knives are friction driven from belt 5 and fruit on said belt is carried around the peripheral edges of the annular knives to a point adjacent the fingered roller 21 at which point the fruit will not fall away from the annular knives since the point where belt 5 leaves the knives is approximately halfway up the side of the circle defined by said knives. Closely adjacent the point where the belt 5 leaves the dicing knives I provide a scraper 25 (Fig. 4) that scrapes across the outer surface of belt 5, thus freeing the fruit of any tendency to come away from the cutting knives, since the fruit tends to stick to the belt by force of suction thereto. The scraper 25 is a plate mounted on a bolt 26, which bolt is adjustably secured to a bracket 27 extending from side frame member 10 by nuts 28.

Referring more specifically to Fig. 4, the roller 13 is mounted on a shaft 29 that rotatably extends at its opposite ends through the upper ends of generally vertically extending opposed arms 30 which arms are rigidly connected together by a side plate 31 extending between the arms. A cross shaft 32 extending between the sides 10, 11 and therethrough at opposite ends of the shaft, rotatably extends through openings in the lower ends of the arms, and the shaft 32 also rotatably extends through an opening in the lower end of the cross head 33 of a substantially T-shaped casting, said casting being disposed with the leg 34 thereof extending horizontally and with the cross head extending generally vertically, said casting being on the outer side of one of the arms 30. The outer end of the leg 34 is provided with a generally vertically extending bolt 35 threadedly extending through said leg, the lower end of the bolt engaging a ledge 36 on the side of frame member 9. The arm 30 adjacent the cross head 33 and the upper end of said cross head are similarly formed with matching openings for receiving a shear pin 37 therethrough, such as a relatively light nail or other pin of sufficient strength to hold the arms 30 in position with the roller 13 forcing the belt against the dicing device, but which pin will be immediately sheared off in the event any unusually hard substance, such as a fruit pit, rock, twig or the like is carried to engagement between the knives of the dicing device and belt, and immediately upon the pin 37 being sheared off by reason of such hard substance engaging the knives, the roller 13 will drop away from the aforesaid belt supporting position and the movement of the belt and dicing device will stop until the impurity is removed and the shear pin is replaced. This provides positive and immediate notice to the operator that a hard foreign substance is mixed with the fruit or is on belt 5, and also positively insures against any injury to the dicing knives, and also insures against imperfect cutting of fruit as would occur were the belt sufficiently slack to permit the hard substance to pass the cutting knives with the fruit.

I also provide improved means for holding the fruit halves on belt, during cutting thereof by a pair of band saws, 38, 39 (Figs. 2, 3), the upper runs of which extend across the upper surface of belt 1. These saws have their teeth facing toward the oncoming fruit halves, saw 38 being at an elevation above belt 1 double the elevation of saw 39, and which saw 38 initially engages the oncoming fruit. The space between the saws and between saw 39 and the belt is equal to the spacing of the annular knives and the spacing of the cross knives of the dicing device, and thereby effects a slicing of the fruit halves into slabs the desired thickness of the linear dimensions respectively of the sides of cubes 23, the cross knives and annular knives accomplishing a cross cutting of the slabs to form the cubes.

The horizontal offsetting of the saws, is such as to substantially cause simultaneous cutting of the fruit halves into slices, but at points offset one from the other to prevent binding of the cut slabs.

The fruit halves 2 are held against lateral movement relative to the belt 1 by means of a pair of rows of spring fingers one row being designated 40, and the fingers of the other row being designated 41. The spring fingers 40, 41 are round wire of any suitable rustless material, fingers 40 being bent on itself to substantially form similar loops at the bends, where the flexing occurs, one free end of each of the wires being secured to a bar 42 extending transversely across and above belt 1 in advance of the saws, and from said point of securement to bar 42 the wire of each finger extends horizontally at 43 toward the oncoming fruit to the point of the bend 44 forming the loop, the bend being downward, and from said downward bend the wire extends in slightly a downwardly slanting direction, as at 44', to just above the saw 38, where it terminates. The elevation of the wires 40 above belt 1 at the bends in the wires, is sufficient to enable the fruit halves to pass freely under the wires, but as the halves are carried along the belt, their upper curved sides will obliquely engage the portions 44' of the wires, as best indicated in Fig. 3, the wires being light enough in weight and tension to practically offer no resistance to the sliding of the fruit thereunder, while preventing any displacement of the fruit on the belt during cutting by the saw 38.

The wires 41, instead of turning downward at their bends 45, turn upward and extend over the top of bar 42 and then incline downwardly at 46 and over the top of saw 39 closely adjacent said saw. The action of the wires 41 is identical with that of wires 40, but with respect to saw 39. The provision of a plurality of such wires as 40, 41, enables the wires to follow the curved contour of the fruit halves, hence no sliding of the fruit halves laterally on the belt is possible, and the saws may be run in the same direction without fear of displacement of the fruit, said saws being mounted on flanged pulleys over which they extend, the flanges 48 thereof being on their sides in the direction of movement of the fruit to preclude displacement of the saws from the pulleys, and the saws are operated from any suitable source of power such as a motor 49 having its armature shaft connected to drive the shaft 50 that mounts one pair of the saw pulleys.

Extending transversely over belt 5, I provide a bar 51 mounting a comb-like plate of relatively light spring sheet metal 52 with the teeth 53 of the plate 52 extending slantingly downwardly toward belt 5 in the direction of travel of the fruit and the lower ends of the row of teeth are spaced above the belt just sufficient to clear a single slab of cut fruit. Thus in the event the cut fruit slabs dropping from belt 1 onto belt 2 should not be separated one from the other, or in the event one slab should be slantingly supported at one end on the lowermost slab, such slabs will be evenly distributed to a single layer flat on belt 5 and will be properly cut by the dicing knives into uniform cubes.

The belts 1, 5 are supported on tables 1', 5' as indicated in the drawings, with side strips projecting upwardly along opposite sides of the belts, and any suitable supporting legs for the belt pulleys and dicing device are provided, the conveyor belts generally at a level to permit an operator to observe the movement of the fruit thereon.

In actual practice, the conveyor belts move very rapidly, carrying the fruit past the saws and to the dicing knives at a speed too great to clearly distinguish the individual fruit halves being moved, and a continuous stream of dices fall into chute 24 from the dicing device.

While ordinarily uncooked fruit is used for dicing, I have used my machine for cooked fruit with equal success without mutilation of the fruit, and also, the machine is used for dicing carrots, beets, and other vegetables.

Having described my invention, I claim:

1. In a fruit dicing machine, a rotary cutting device comprising a horizontal row of spaced, opposed, axially aligned annular cutting blades and traverse cutting blades intersecting the annular blades at spaced points therearound and means for supporting said annular and transverse blades in the aforesaid relation, means mounting said cutting device for revolving about the central axis of the annular blades, said annular and transverse blades being formed with cutting edges facing radially outwardly of said axis, a conveyor belt frictionally engaging the peripheral side of said device arranged and adapted for revolving said device and for carrying fruit thereon to between the belt and the annular and cross blades for cutting by said blades upon actuation of the belt to revolve the device, and means for actuating said belt.

2. In a fruit dicing machine, a rotary cutting device comprising a horizontal row of spaced, opposed, axially aligned annular cutting blades and transverse cutting blades intersecting the annular blades at spaced points therearound and means for supporting said annular and said transverse blades in the aforesaid relation, means mounting said cutting device for revolving about the central axis of the annular blades, said annular and transverse blades being formed with cutting edges facing axially outwardly of said axis, a horizontally extending roller positioned adjacent the lower peripheral side of said cutting device mounted for rotation on an axis parallel with the first mentioned axis and a second roller positioned adjacent a lateral peripheral side of said cutting device mounted for rotation on an axis parallel with the axis of the first mentioned roller, an endless generally horizontally extending belt having a portion of the upper run thereof extending over both of said rollers and in frictional driving engagement with the peripheral surface of the cutting device between said rollers for rotating the cutting device upon longitudinal movement of said run, belt actuating means for causing said movement of said upper run, said belt being adapted to support fruit on the upper run thereof for carrying the fruit to the annular and transverse cutting blades upon actuation of said belt actuating means for causing said movement of said run in a direction from the first mentioned roller toward the second roller.

3. In a fruit dicing machine, a rotary cutting device comprising a horizontal row of spaced, opposed, axially aligned annular cutting blades and transverse cutting blades intersecting the annular blades at spaced points therearound and means for supporting said annular and transverse blades in the aforesaid relation including annular members at opposite ends of said row in axial alignment with said annular cutting blades, a conveyor belt extending below said device in substantial frictional engagement with the peripheral surfaces of said members for carrying fruit thereon to the cutting blades disposed between said members for cutting by said annular and said transverse cutting blades, a portion of said belt extending from below the device around substantially a quarter of the peripheral sides thereof for continuously supporting the fruit over the length of said portion in cutting engagement with the annular blades, and means at one end of said portion for separating the fruit from the surface of the belt for carrying of the fruit by said blades away from said belt at said end, and means for moving the belt for carrying the fruit to the cutting blades and for revolving said cutting device.

4. In dicing apparatus of the character described, horizontally extending conveyor means for supporting fruit units thereon for movement in a generally horizontally extending path of travel, means for cutting said fruit units into flat superposed slices of uniform thickness during movement of the units along said path, means at a point in said path of travel arranged and adapted to automatically cause distribution of said slices on said belt to within a single plane, a cutting device arranged and adapted to substantially simultaneously cut said slices transversely of the plane thereof into cubes, said conveyor means including a belt conveyor arranged and adapted to carry the slices in said single plane to said cutting device for cutting thereby into cubes, and means operative by a predetermined resistance to cutting by said cutting device arranged and adapted to render said belt conveyor and said cutting device respectively inoperative for carrying the slices to the cutting device and for cutting of the slices into cubes.

5. In a fruit dicing machine, a rotary cutting device comprising a horizontal row of spaced, opposed, axially aligned annular cutting blades and transverse cutting blades intersecting the annular blades at spaced points therearound and means for supporting said annular and transverse blades in the aforesaid relation, means mounting said cutting device for revolving about the central axis of the annular blades, said annular and transverse blades being formed with cutting edges facing radially outwardly of said axis, a conveyor belt frictionally engaging the peripheral side of said device arranged and adapted for revolving said device and for carrying fruit thereon to between the belt and the annular and cross blades for cutting by said blades upon actuation of the belt to revolve the device and means for actuating said belt, the frictional engagement between said belt and cutting device extending from a point below the cutting device around the same to approximately the level of said central axis.

6. In a fruit dicing machine, a rotary cutting device comprising a horizontal row of spaced, opposed, axially aligned, annular cutting blades and transverse cutting blades intersecting the annular blades at spaced points therearound, means for supporting said annular and said transverse blades in the aforesaid relationship, means mounting said cutting device for revolving about the central axis of the annular blades, said annular and said transverse blades being formed with cutting edges facing axially outwardly of said axis, a horizontally extending roller positioned adjacent the lower peripheral side of said cutting device mounted for rotation on an axis parallel with the first mentioned axis and a second roller positioned adjacent a lateral peripheral side of said cutting device mounted for rotation on an axis parallel with the axis of the first mentioned roller, an endless, generally horizontally extending belt having a portion of the upper run thereof extending over both of said rollers and in frictional engagement with the peripheral surface of the cutting device between said rollers for rotating said cutting device upon longitudinal movement of said run, said belt being adapted to support fruit on the upper run thereof for carrying the fruit to the annular and transverse cutting blades upon movement of said run in a direction from the first mentioned roller toward said second roller, means for causing said movement of said upper run, and roller supporting means mounting said second roller for swinging the roller generally toward and away from said cutting device, means normally supporting said roller supporting means in position relatively closely adjacent said lateral peripheral side of the cutting device including a shear pin adapted to be sheared off upon a predetermined resistance to cutting of material on the portion of the belt between the rollers by said blades whereby said roller supporting means will permit swinging of the roller carried thereby in direction away from the cutting device to carry the belt out of frictional driving relation with said cutting device.

7. A cylindrical fruit dice cutter comprising a pair of co-axially disposed annular rings formed with a series of corresponding co-planar slots extending radially of the axis of the rings, elongated cross blades having their respective ends fitted into the corresponding co-planar slots and spaced, annular, ring-like blades having peripheral shaped edges and said ring-like blades being carried by said cross blades and positioned in planes disposed transversely of the axis of said rings, said ring-like blades projecting radially outwardly of said cross blades and having their sharpened peripheral edges in cylindrical alignment.

8. A cylindrical fruit dice cutter comprising a pair of co-axially disposed annular rings formed with a series of corresponding co-planar slots extending radially of the axis of the rings, elongated cross blades having their respective ends fitted into the corresponding co-planar slots and spaced, annular, ring-like blades carried by said cross blades poistioned in planes disposed transversely of the axis of said rings, means providing axially aligned cylindrical bearing surfaces adjacent each end of said cutter for tractive engagement by a belt, a frame, means rotatably supporting said cutter on said frame, means on the frame positioning such belt in tractive engagement with said aligned cylindrical bearing surfaces, and means including such belt for driving said cutter.

9. A cylindrical fruit dice cutter comprising a pair of co-axially disposed annular rings formed with a series of corresponding co-planar slots extending radially of the axis of the rings, elongated cross blades having their respective ends fitted into the corresponding co-planar slots and spaced, annular, ring-like blades carried by said cross blades positioned in planes disposed transversely of the axis of said rings, a peripheral ring gear secured to one end of the cutter, a frame, means mounting said cutter and gear for rotation in said frame, a fingered roller mounted in said frame for rotary movement of the fingers into the spaces between the blades of the cutter, means including a spur gear in mesh with said ring gear for insuring that said fingers do not engage the cutter blades and for causing the fingers to positively and successively enter and leave said spaces, and means including a belt engaging said cutter for driving said cutter and said ring gear.

10. In combination, a frame, a cylindrical cutter having annular ring blades with sharpened peripheral edges and cross blades with radially outwardly disposed sharpened edges disposed within the peripheral limits of said annular blade edges, a belt tractively disposed in engagement with the edges of said annular knives for driving the cutter and for feeding fruit thereto for cutting thereby, a pulley engaging the belt and means including a shear pin for positioning the pulley against the belt in a position supporting the belt against the cutter.

11. In combination, a frame, a cylindrical cutter having a row of annular blades in co-axial alignment with spaced cross blades disposed around the circumferential length of the annular blades extending transversely of the planes of said annular blades and end members at each end of said row formed with circular peripheral surfaces disposed for tractive engagement by a conveyor belt adapted to extend over the peripheral edges of the annular blades, a conveyor belt for driving said cutter, said belt extending in the direction of its width over the peripheral edges of the annular blades and over the cross blades at one side of the cutter and in tractive engagement with the peripheral surfaces of said end members for a substantial distance around said peripheral surfaces, means supporting said cutter on said frame for revolving the annular blades and cross blades about the central axis of the annular blades, upon movement of said conveyor belt lengthwise, means supporting said belt in said tractive engagement with said surfaces including a pulley engaging the side of the belt outwardly of the side engaging said surfaces, pulley supporting means carrying said pulley and holding said pulley in a position for urging the belt against said surfaces, means pivotally securing said pulley supporting means on said frame for swinging the pulley from said position to a position supporting said belt substantially out of tractive engagement with said surfaces, locking means releasably holding the pulley supporting means in said first mentioned position and operative by a predetermined radially outward pressure against the portion of the belt extending across said side of the cutter for releasing said pulley supporting means for moving to said position in which the pulley supports the belt substantially out of tractive engagement with said surfaces whereby the cutter will be rendered inoperative for revolving by the belt until the pulley supporting means is again locked in said first mentioned position.

FRANK A. WOOL.